US012573348B1

(12) United States Patent
Du et al.

(10) Patent No.: US 12,573,348 B1
(45) Date of Patent: Mar. 10, 2026

(54) GATE DRIVER, DISPLAY DEVICE, AND DRIVING METHOD OF DISPLAY PANEL

(71) Applicant: HIMAX TECHNOLOGIES LIMITED, Tainan City (TW)

(72) Inventors: Wei-Hong Du, Tainan City (TW); Yi Jung Cheng, Tainan City (TW); Yueh-Feng Chung, Tainan City (TW)

(73) Assignee: HIMAX TECHNOLOGIES LIMITED, Tainan City (TW)

( * ) Notice: Subject to any disclaimer, the term of this patent is extended or adjusted under 35 U.S.C. 154(b) by 0 days.

(21) Appl. No.: 19/090,415

(22) Filed: Mar. 26, 2025

(51) Int. Cl.
*G09G 3/36* (2006.01)
*G06F 3/041* (2006.01)

(52) U.S. Cl.
CPC ......... *G09G 3/3674* (2013.01); *G06F 3/0412* (2013.01); *G06F 3/04166* (2019.05); *G09G 2320/02* (2013.01); *G09G 2354/00* (2013.01)

(58) Field of Classification Search
CPC ............. G09G 3/3674; G09G 2320/02; G09G 2354/00; G06F 3/0412; G06F 3/04166
See application file for complete search history.

(56) References Cited

U.S. PATENT DOCUMENTS 3,898,441 A * 8/1975 Davis ................... G06F 11/2097
290/40 R
10,955,952 B2 * 3/2021 Gwon ..................... G06F 3/044

2002/0196246 A1* 12/2002 Kanzaki ............... G09G 3/3696
345/208
2004/0174330 A1* 9/2004 Huang ................. G09G 3/3677
345/100
2007/0018929 A1* 1/2007 Yi ......................... G09G 3/3648
345/96
2015/0269897 A1* 9/2015 Kitsomboonloha .........................
G06F 3/04166
345/87
2016/0202829 A1* 7/2016 Choi ..................... G06F 3/0443
345/174
2017/0031505 A1* 2/2017 Kwon ................... G06F 3/0412
2018/0025691 A1* 1/2018 Ota ....................... G09G 3/3413
345/96
2018/0164928 A1* 6/2018 Li ......................... G02F 1/13338
2022/0206664 A1* 6/2022 Jung ................... G06F 3/04166

* cited by examiner

*Primary Examiner* — Benyam Ketema
(74) *Attorney, Agent, or Firm* — JCIPRNET

(57) ABSTRACT

A gate driver, a display device, and a driving method of a display panel are provided. The gate driver is coupled to a display panel with a plurality of scan lines. The gate driver includes an output enable control circuit and a channel scan circuit. The output enable control circuit receives an output enable signal and a touch input signal to provide an odd scan enable signal and an even scan enable signal. The channel scan circuit receives the odd scan enable signal, the even scan enable signal, a column pulse signal, and a scan timing signal to control the scan lines sequentially. During a long horizontal mode period, the output enable control circuit masks the odd scan enable signal and the even scan enable signal in a disabled state based on the touch input signal is enabled and the output enable signal is enabled.

15 Claims, 5 Drawing Sheets

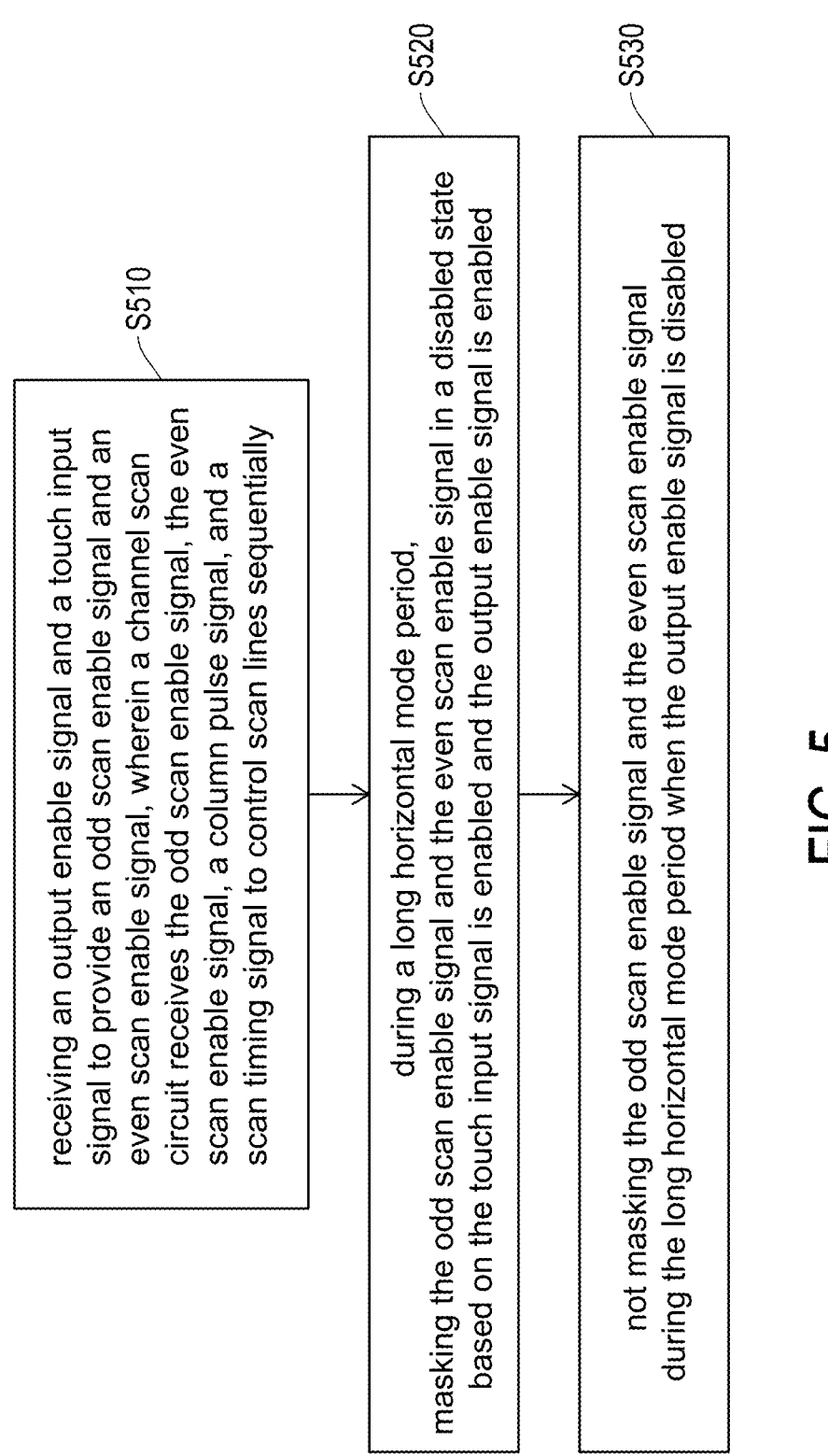

receiving an output enable signal and a touch input signal to provide an odd scan enable signal and an even scan enable signal, wherein a channel scan circuit receives the odd scan enable signal, the even scan enable signal, a column pulse signal, and a scan timing signal to control scan lines sequentially — S510 during a long horizontal mode period, masking the odd scan enable signal and the even scan enable signal in a disabled state based on the touch input signal is enabled and the output enable signal is enabled — S520 not masking the odd scan enable signal and the even scan enable signal during the long horizontal mode period when the output enable signal is disabled — S530

FIG. 5

GATE DRIVER, DISPLAY DEVICE, AND DRIVING METHOD OF DISPLAY PANEL

BACKGROUND

Technical Field

The present invention generally relates to a technology for driving a display device, and more particularly to a gate driver, a display device, and a driving method of the display panel.

Description of Related Art

Recently the display device is noticed, wherein the contact detector of so-called touch panel be directly attached on a liquid crystal display, and show on the liquid crystal display various button images be used as the substitute of typical button, so that information is allowed to input. Furthermore, as the size of the display panel increases, the design of the driving circuits becomes more challenging, requiring solutions to issues that were not encountered in smaller display panels.

SUMMARY

The disclosure provides a gate driver and a driving method of the display panel, which prevents abnormal images being presented on the display panel.

A gate driver according to the disclosure is provided. The gate driver is coupled to a display panel with a plurality of scan lines. The gate driver includes an output enable control circuit and a channel scan circuit. The output enable control circuit receives an output enable signal and a touch input signal to provide an odd scan enable signal and an even scan enable signal. The channel scan circuit is coupled to the output enable control circuit. The channel scan circuit receives the odd scan enable signal, the even scan enable signal, a column pulse signal, and a scan timing signal to control the scan lines sequentially. During a long horizontal mode period, the output enable control circuit masks the odd scan enable signal and the even scan enable signal in a disabled state based on the touch input signal is enabled and the output enable signal is enabled.

A driving method of a display panel according to the disclosure is provided. The display panel includes a plurality of scan lines. The driving method comprises: receiving an output enable signal and a touch input signal to provide an odd scan enable signal and an even scan enable signal, wherein a channel scan circuit receives the odd scan enable signal, the even scan enable signal, a column pulse signal, and a scan timing signal to control the scan lines sequentially; and, during a long horizontal mode period, masking the odd scan enable signal and the even scan enable signal in a disabled state based on the touch input signal is enabled and the output enable signal is enabled.

A display device according to the disclosure is provided. The display device includes a display panel, a gate driver, a source driver, and a timing controller. The display panel includes a plurality of pixel cells, a plurality of scan lines, and a plurality of data lines. The plurality of pixel cells are coupled to the scan lines and the data lines. The gate driver is coupled to the scan lines. The source driver is coupled to the data lines. The timing controller is coupled to the gate driver and the source driver. The timing controller provides the output enable signal, the touch input signal, a column pulse signal, and a scan timing signal. The gate driver includes an output enable control circuit and a channel scan circuit. The output enable control circuit receives the output enable signal and the touch input signal to provide an odd scan enable signal and an even scan enable signal. The channel scan circuit is coupled to the output enable control circuit. The channel scan circuit receives the odd scan enable signal, the column pulse signal, and the scan timing signal to control the scan lines sequentially. During a long horizontal mode period, the output enable control circuit masks the odd scan enable signal and the even scan enable signal in a disabled state based on the touch input signal is enabled and the output enable signal is enabled.

Based on the above, the gate driver described in the embodiment of the disclosure can disable the odd scan enable signal and the even scan enable signal during the long horizontal mode period when the touch input signal is enabled and the output enable signal is enabled, thus the odd number of the scan lines and the even number of the scan lines are all disabled, and abnormal horizontal lines no longer appear on the display panel during the long horizontal mode period.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 5 is a flow chart for a driving method of a display panel according to an embodiment of the disclosure.

DESCRIPTION OF THE EMBODIMENTS

Figure 1:
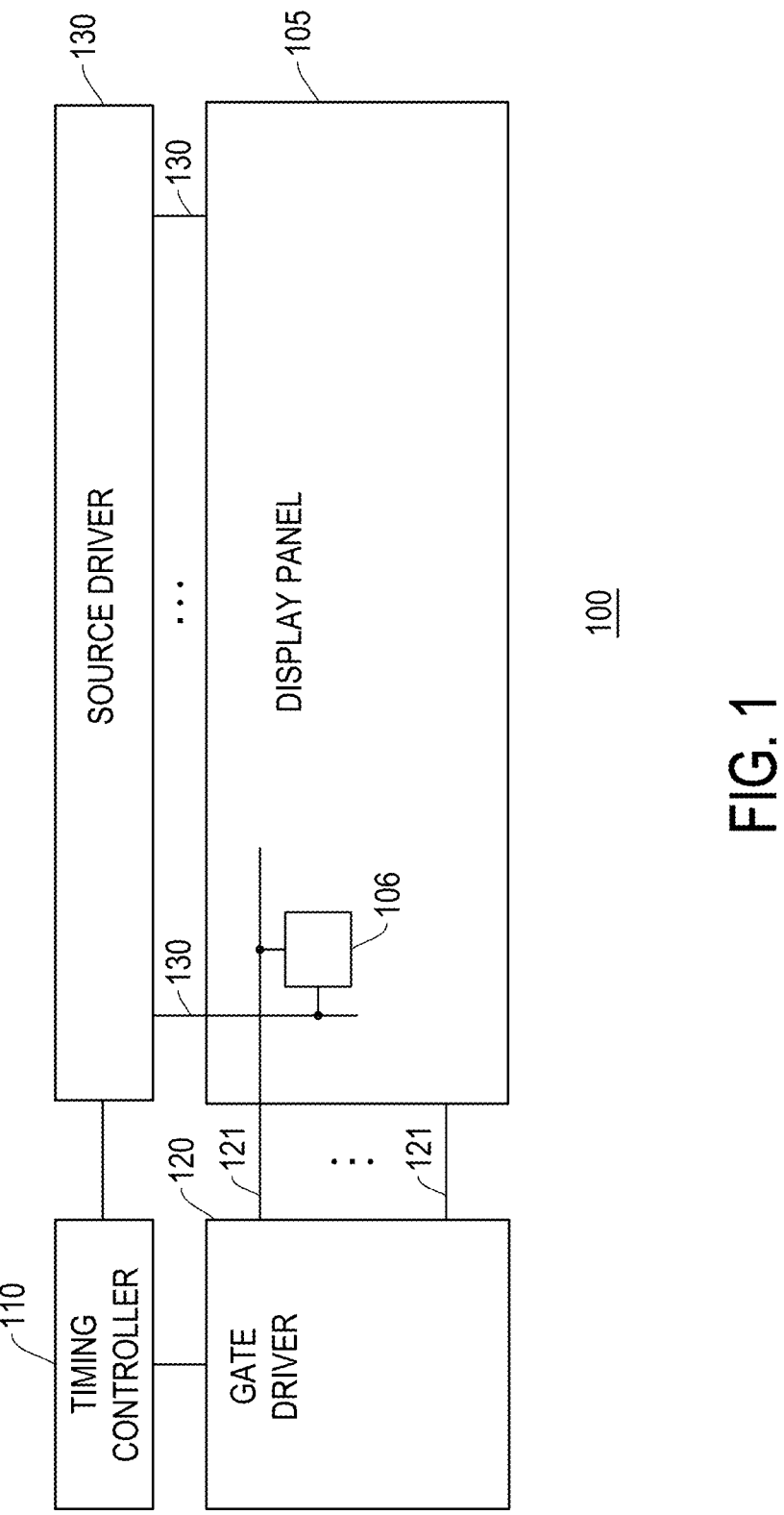
FIG. 1 is a schematic view of a display device 100 according to an embodiment of the disclosure.

FIG. 1 is a schematic diagram of a display device 100 according to an embodiment of the disclosure. The display device 100 includes a display panel 105, a timing controller 110, a gate driver 110, and a source driver 120. The display panel 105 includes a plurality of pixel cells (e.g., a pixel cell 106), a plurality of scan lines 121, and a plurality of data lines 131. The plurality of pixel cells are coupled to the scan lines and the data lines. The plurality pixel cells (e.g., the pixel cell 106) arranged in array manner. Each pixel cell is coupled to one of the scan lines 121 and one of the data lines 131.

The timing controller 110 is coupled to the gate driver 110 and the source driver 120. The gate driver 120 is coupled to the scan lines 121 of the display panel 105, and the source driver 130 is coupled to the data lines 131 of the display panel 105. In the embodiment, the timing controller 110 complies with large touch and display driver integration (LTDI) technology.

The timing controller 110 controls the gate driver 120 and the source driver 130 for display images on the display panel 105. When one of the scan lines 121 is enabled by the gate driver 120, the source driver 130 provides the driving voltages to the pixel cells (e.g., the pixel cell 106) on corresponding one of the data lines 131.

Figure 2:
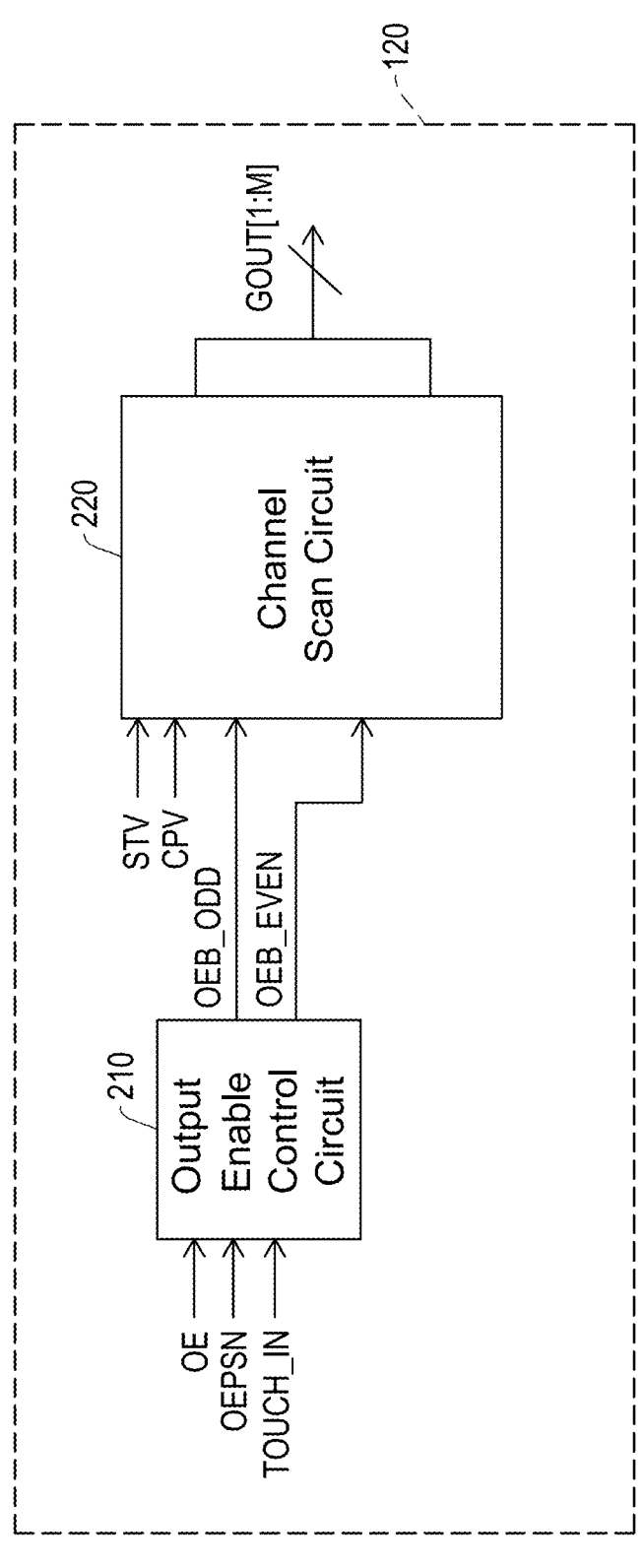
FIG. 2 is a schematic view of a gate driver 130 according to an embodiment of the disclosure.

FIG. 2 is a schematic view of a gate driver 120 according to an embodiment of the disclosure. The gate driver 120 is coupled to the display panel 102 with the plurality of the scan lines 121 shown in FIG. 1. The gate driver 120 includes an output enable control circuit 210 and a channel scan circuit 220. The output enable control circuit 210 receives an output enable signal OE and a touch input signal TOUCH_IN to provide an odd scan enable signal OEB_ODD and an even scan enable signal OEB_EVEN. The output enable control circuit 210 further receives an output enable pin signal OEPSN. The output enable pin signal OEPSN is to control a time period while the time period indicates the opening interval of two adjacent gate lines.

The channel scan circuit 220 is coupled to the output enable control circuit 210. The channel scan circuit 220 receives the odd scan enable signal OEB_ODD, a column pulse signal CPV, and a scan timing signal STV to control an odd number of the scan line signals GOUT[1], GOUT[3], GOUT[5] . . . etc. sequentially enabled. The channel scan circuit 220 further receives the even scan enable signal OEB_EVEN, the column pulse signal CPV, and the scan timing signal STV to control an even number of the scan line signals GOUT[2], GOUT[4], GOUT[6] . . . etc. sequentially enabled. In other words, the channel scan circuit provides the scan line signals GOUT[1:M] to the scan lines 121 of FIG. 1 respectively.

Figure 3:
FIG. 3 is a waveform diagram of signals in FIG. 2 according to a first embodiment of the disclosure.

FIG. 3 is a waveform diagram of signals in FIG. 2 according to a first embodiment of the disclosure. The timing controller 110 of FIG. 1 provides the output enable signal OE, the output enable pin signal OEPSN, the column pulse signal CPV, and the scan timing signal STV. In FIG. 3, in the time period TP1, the column pulse signal CPV has a plurality of pulses to make the output enable signal OE having a plurality of pulses. The odd scan enable signal OEB_ODD and the even scan enable signal OEB_EVEN are enabled (e.g., logic '0') in a interlace matter. Thus, the scan line signals GOUT[N−3] and GOUT[N−1] are sequentially enabled based on the odd scan enable signal OEB_ODD, and the scan line signal GOUT[N−2] is enabled based on the even scan enable signal OEB_EVEN.

During the long horizontal mode period LHM, the display device 100 of FIG. 1 may stop the column pulse signal CPV at time point TO, and perform touch sensing operation of the display device 100 to obtain the touch data. But, while the column pulse signal CPV at time point TO is stopped, the output enable signal OE may always enabled (e.g., the mark 310), and then one of the odd scan enable signal OEB_ODD and the even scan enable signal OEB_EVEN may always enabled (e.g., the mark 320 for the enabled even scan enable signal OEB_EVEN (in logic '1')). Thus, one of the scan line signals (e.g., the scan line signal GOUT[N]) are enabled (logic '1' or a gate high voltage) during the long horizontal mode period LHM (e.g., the mark 330) based on the enabled even scan enable signal OEB_EVEN. Thus, abnormal horizontal lines may appear on the display panel 105 of FIG. 1 during the long horizontal mode period LHM, until one pulse of the column pulse signal CPV is raised.

Figure 4:
FIG. 4 is a waveform diagram of signals in FIG. 2 according to a second embodiment of the disclosure.

FIG. 4 is a waveform diagram of signals in FIG. 2 according to a second embodiment of the disclosure. In FIG. 2 and FIG. 4, the output enable control circuit 210 adds the touch input signal TOUCH_IN to control the odd scan enable signal OEB_ODD and the even scan enable signal OEB_EVEN. In detail, during the long horizontal mode period LHM between the time points T1 and T4, the touch input signal TOUCH_IN is enabled (logic '1'). During the time other than the long horizontal mode period LHM, the touch input signal TOUCH_IN is disabled (logic '0'). During the time period between the time points T1 and T2, the pulses of the column pulse signal CPV is stopped until to the time point T4 (the end of the long horizontal mode period LHM). After the touch input signal TOUCH_IN is enabled (logic '1'), the output enable signal OE is enabled (logic '1') during a time period between the time points T2 and T3 (e.g., the mark 410). During the time period T2 to T3 in the long horizontal mode period LHM, the output enable control circuit 210 of FIG. 2 masks the odd scan enable signal OEB_ODD and the even scan enable signal OEB_EVEN in a disabled state (logic '0' or a gate low voltage) (e.g., the marks 430 and 440) based on the touch input signal TOUCH_IN is enabled and the output enable signal OE is enabled. Thus, all of the scan line signals GOUT[1:M] are disabled (logic '0') (e.g., the mark 460). In other words, the odd number of the scan lines and the even number of the scan lines are in a disabled state while the odd scan enable signal OEB_ODD and the even scan enable signal OEB_EVEN in the disabled state.

At the time point T3, the output enable signal OE is changed from the enabled state to the disabled state (e.g., the mark 445), thus the odd scan enable signal OEB_ODD, the even scan enable signal OEB_EVEN (e.g., the mark 450), and all of the scan line signals GOUT[1:M] are not masked. In other words, the output enable control circuit 210 of FIG. 2 does not mask the odd scan enable signal OEB_ODD and the even scan enable signal OEB_EVEN during the long horizontal mode period LHM when the output enable signal OE is disabled. At the time point T4, the touch input signal TOUCH_IN is changed from the enabled state to the disabled state.

FIG. 5 is a flow chart for a driving method of a display panel according to an embodiment of the disclosure. The driving method of a display panel is applied to the display device 100 of FIG. 1 or the gate driver 120 of FIG. 2. In the step S510, the timing controller 110 provides the output enable signal OE and the touch input signal TOUCH_IN, and the output enable control circuit 210 receives the output enable signal OE and the touch input signal TOUCH_IN to provide the odd scan enable signal OEB_ODD and the even scan enable signal OEB_EVEN. The channel scan circuit 220 of FIG. 2 receives the odd scan enable signal OEB_ODD, the even scan enable signal OEB_EVEN the column pulse signal CPV provided by the timing controller 110, and the scan timing signal STV provided by the timing controller 110 to control the scan lines sequentially.

In the step S520, during the long horizontal mode period LHM, the output enable control circuit 210 masks the odd scan enable signal OEB_ODD and the even scan enable signal OEB_EVEN in a disabled state (e.g., logic '0' or a gate low voltage) based on the touch input signal TOUCH_IN is enabled and the output enable signal OE is enabled. In the step S530, the output enable control circuit 210 does not mask the odd scan enable signal OEB_ODD and the even scan enable signal OEB_EVEN during the long horizontal mode period LHM when the output enable signal OE is disabled. Please may refer to the above embodiments for details of the steps S510-S530.

In summary, the gate driver described in the embodiment of the disclosure can disable the odd scan enable signal and the even scan enable signal during the long horizontal mode period when the touch input signal is enabled and the output enable signal is enabled, thus the odd number of the scan lines and the even number of the scan lines are all disabled, and abnormal horizontal lines no longer appear on the display panel during the long horizontal mode period.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A gate driver, coupled to a display panel with a plurality of scan lines, wherein the gate driver comprising:
an output enable control circuit, wherein the output enable control circuit receives an output enable signal and a touch input signal to provide an odd scan enable signal and an even scan enable signal; and
a channel scan circuit, coupled to the output enable control circuit, receiving the odd scan enable signal, the even scan enable signal, a column pulse signal, and a scan timing signal to control the scan lines sequentially, during a long horizontal mode period, the output enable control circuit masks the odd scan enable signal and the even scan enable signal in a disabled state based on the touch input signal is enabled and the output enable signal is enabled.

2. The gate driver of claim 1, wherein the output enable control circuit does not mask the odd scan enable signal and the even scan enable signal during the long horizontal mode period when the output enable signal is disabled.

3. The gate driver of claim 1, wherein the odd scan enable signal and the even scan enable signal are at a gate low voltage in the disabled state.

4. The gate driver of claim 1, wherein the touch input signal is enabled during the long horizontal mode period, and a touch sensing operation of the touch panel is performed.

5. The gate driver of claim 1, wherein an odd number of the scan lines and an even number of the scan lines are in a disabled state while the odd scan enable signal and the even scan enable signal in the disabled state.

6. A driving method of a display panel, wherein the display panel comprises a plurality of scan lines, wherein the driving method comprising:
receiving an output enable signal and a touch input signal to provide an odd scan enable signal and an even scan enable signal, wherein a channel scan circuit receives the odd scan enable signal, the even scan enable signal, a column pulse signal, and a scan timing signal to control the scan lines sequentially; and
during a long horizontal mode period, masking the odd scan enable signal and the even scan enable signal in a disabled state based on the touch input signal is enabled and the output enable signal is enabled.

7. The driving method of claim 6, further comprising:
not masking the odd scan enable signal and the even scan enable signal during the long horizontal mode period when the output enable signal is disabled.

8. The driving method of claim 6, wherein the odd scan enable signal and the even scan enable signal are at a gate low voltage in the disabled state.

9. The driving method of claim 6, wherein the touch input signal is enabled during the long horizontal mode period, and a touch sensing operation of the touch panel is performed.

10. The driving method of claim 6, wherein an odd number of the scan lines and an even number of the scan lines are in a disabled state while the odd scan enable signal and the even scan enable signal in the disabled state.

11. A display device, comprising:
a display panel, comprising a plurality of pixel cells, a plurality of scan lines, and a plurality of data lines, the plurality of pixel cells are coupled to the scan lines and the data lines;
a gate driver, coupled to the scan lines;
a source driver, coupled to the data lines; and
a timing controller, coupled to the gate driver and the source driver,
wherein the timing controller provides an output enable signal, a touch input signal, a column pulse signal, and a scan timing signal,
wherein the gate driver comprising:
an output enable control circuit, wherein the output enable control circuit receives the output enable signal and the touch input signal to provide an odd scan enable signal and an even scan enable signal; and
an channel scan circuit, coupled to the output enable control circuit, receiving the odd scan enable signal, the even scan enable signal, the column pulse signal, and the scan timing signal to control the scan lines sequentially,
during a long horizontal mode period, the output enable control circuit masks the odd scan enable signal and the even scan enable signal in a disabled state based on the touch input signal is enabled and the output enable signal is enabled.

12. The display device of claim 11, wherein the output enable control circuit does not mask the odd scan enable signal and the even scan enable signal during the long horizontal mode period when the output enable signal is disabled.

13. The display device of claim 11, wherein the odd scan enable signal and the even scan enable signal are at a gate low voltage in the disabled state.

14. The display device of claim 11, wherein the touch input signal is enabled during the long horizontal mode period, and a touch sensing operation of the touch panel is performed.

15. The display device of claim 11, wherein an odd number of the scan lines and an even number of the scan lines are in a disabled state while the odd scan enable signal and the even scan enable signal in the disabled state.

* * * * *